United States Patent [19]

Thomaswick et al.

[11] Patent Number: 4,512,473
[45] Date of Patent: Apr. 23, 1985

[54] ADJUSTABLE SHIPPING CONTAINER FOR FRANGIBLE SHEET-LIKE UNITS

[75] Inventors: Ronald J. Thomaswick, Kittanning; James R. Rowley, Freeport, both of Pa.

[73] Assignee: PPG Industries, Inc., Pittsburgh, Pa.

[21] Appl. No.: 599,042

[22] Filed: Apr. 11, 1984

Related U.S. Application Data

[63] Continuation of Ser. No. 446,111, Dec. 2, 1982, abandoned.

[51] Int. Cl.³ .............................................. B65D 85/48
[52] U.S. Cl. .................................. 206/454; 206/448; 206/597; 206/599; 206/600
[58] Field of Search ............... 206/386, 454, 448, 600, 206/597, 599

[56] References Cited

U.S. PATENT DOCUMENTS 3,906,591  9/1975  Boiardi ................................ 206/597
3,924,871  12/1975  Mesenbring ........................ 206/597

Primary Examiner—Joseph Man-Fu Moy
Attorney, Agent, or Firm—Robert A. Westerlund, Jr.; Donald Carl Lepiane

[57] ABSTRACT

A reusable shipping container for frangible sheets and the like having a three part telescoping base adjustable in length and a pair of three part telescoping transverse sheet support frames adjustable in height removably attached to the ends of the base wherein the container is unitized using flexible banding straps having load bearing loops for lifting the container. The container also provides removable caster wheels and sheet edge contacting separator strips. The container is particularly adapted for shipping, storing and unloading large multiple glazed window units of the type used in large commercial buildings. A method of unloading a container in which one of the transverse sheet support frames is moved from an end position on the base to a position nearer the other transverse support frame is also disclosed.

5 Claims, 4 Drawing Figures

ADJUSTABLE SHIPPING CONTAINER FOR FRANGIBLE SHEET-LIKE UNITS

This is a continuation of application Ser. No. 446,111, filed Dec. 2, 1982, now abandoned.

BACKGROUND OF THE INVENTION

1. Field of the Invention

This invention relates to an adjustable unitized shipping container for frangible sheet-like units and, more particularly, to a reusable container for shipping, storing and unloading large multiple glazed window units.

2. Discussion of the Technical Problems

The emergence of large scale steel construction of office buildings has made possible a constantly increasing size of window surfaces at the same time that the reduced ambient light available in the city environment has increased the demand for more window surface area. These large window surfaces have, however, presented problems in energy transmission such as controlling heat loss in winter, heat gain in summer and insulating against noise while still increasing the amount of light transmitted through the window. To meet those problems, the large glass surfaces employed are generally double glazed with a separating air space between the two sheets of glass.

With the size of the modern double glazed window units increasing, the difficulty of handling the units is also increasing. The units are often as large as 108 inch × 60 inch (274.3 cm × 152.4 cm) and larger. The units typically weigh up to 275 lb. (124.7 kg). Representative of the types of multiple glazed units used in large commercial construction projects include the multiple glazed units as disclosed in U.S. Pat. No. 3,919,023 and U.S. Pat. No. 4,109,431. The multiple glazed units are usually fabricated at a manufacturing facility and shipped to the jobsite.

Once the previously fabricated large multiple glazed units arrive at the site for installation they must also be raised to the floor on which they will be installed. The units may also need to be stored at the site. A conventional container for shipping and storing the units is often a simple wooden crate with suitable bracing and support for the glass. These expendable wood containers are bulky and quite heavy. They also create a disposal problem after use.

During the construction of a building, it is often necessary to provide outside access on each floor for loading and unloading building material using a crane or hoist. This access is often provided by leaving exterior sections unglazed. The sections are later closed by installing the glass. Accordingly, it is necessary to store some multiple glazed units of varying sizes on different floors for later installation. Since storage of some sizes may involve many months, it is necessary that the multiple glazed units be stored in a manner so that they would not become easily broken and yet would be readily available for easy handling and installation when required. Storage space during construction is at premium and the storage container should be designed so as to conserve space.

Since the sizes of multiple glazed units utilized on any given construction job vary considerably with many sizes being utilized at one job site, it is also necessary that the container be the correct size for the multiple glazed unit or be adjustable to the different sizes.

Once the shipping container for the mulitple glazed unit is placed on the floor it must be capable of easy movement. Due to the large size of the multiple glazed unit, typically loaded shipping containers weight upward of 4000 pounds (1814.4 Kg). The containers therefore should be capable of being easily moved with a fork truck, hand lift dollies or by some other method.

As previously mentioned it is the practice in large commercial construction to utilize one or more cranes for lifting building material, such as the multiple glazed window units, from the ground surface up to the floor where they will be utilized. Many types of building materials compete for the scant crane time available. It would be advantageous, therefore, for any multiple glazed unit shipping container to provide a structure which would allow for easy crane attachment and disengagement.

Once the shipping container is placed on the floor and the glass is to be unpacked, the container should be capable of easy unloading and a minimum of waste material should be generated by unpacking and unloading the glass. The empty containers should also not take up much space.

Given the problems discussed above, it would be advantageous to provide a returnable steel shipping container for shipping multiple glazed units to building construction locations. The container should be adjustable to accommodate various glass lengths and widths and the container should be crane hoistable and easily unpacked. It should also be capable of easy movement upon the floor location. The container should provide adequate interim storage for units not yet installed, and the container should not be burdensome to remove from the building site. The instant invention is directed to those needs.

SUMMARY OF THE INVENTION

This invention relates to a returnable steel container for shipping multiple glazed units to building construction locations. The returnable rack replaces expendable wood containers and provides adjustment in length and width for handling large and small architectural and environmental glass products. The adjustable rack provides a telescoping base and telescoping transverse frames. The transverse frames are removable to facilitate packing, unpacking and nesting for return shipment of the rack. Cushion pads and glass separation strips are attached to the transverse frames as well as to the base. Steel band strapping is used to close the container and provide handling by overhead cranes in that the steel band straps provide loops in the upper portion which allows the entire loaded container to be picked up by the banding. The base of the container is designed for fork truck handling as well as for attaching removable caster wheels. The adjustable feature of the invention provides a three part telescoping base adjustable in length and a pair of three part telescoping transverse sheet support frames adjustable in height. The entire container once loaded, is unitized for shipment with steel banding straps that traverse under the base and around the transverse frames paralleling the edge periphery of the glass units.

This invention also relates to a unitized container of stacked glass sheets or multiple glazed units; the container having a base adjustable in length, a pair of transverse support frames adjustable in height, a plurality of glass sheets such as multiple glazed units positioned on edge and supported in the vertical position by edge contacting separator strips attached to the base and the transverse support frames and further including flexible steel band strapping routed under the base, over the transverse support frames and tensioned in a manner to unitize the container.

A method of storage and unloading of the above-described container is facilitated by the invention's structure in that a pair of inverted "U" shaped transverse support frames are removably inserted into the base therefore allowing either end support frame to be detached and moved along the base to a location closer to the opposite end where it can be reinserted in the base. When the container is thus configured, the multiple glazed units are exposed to easy access for installation. A single multiple glazed unit can be stored in a safe edgewise condition in that it is constantly supported by glass separator strips on the transverse support frames as well as resting on edge on the base.

For ease of movement, removable caster wheels are provided attached to the base thereby allowing the large units to be moved near the point of installation without additional apparatus.

DESCRIPTION OF THE PREFERRED EMBODIMENT

Figure 1:
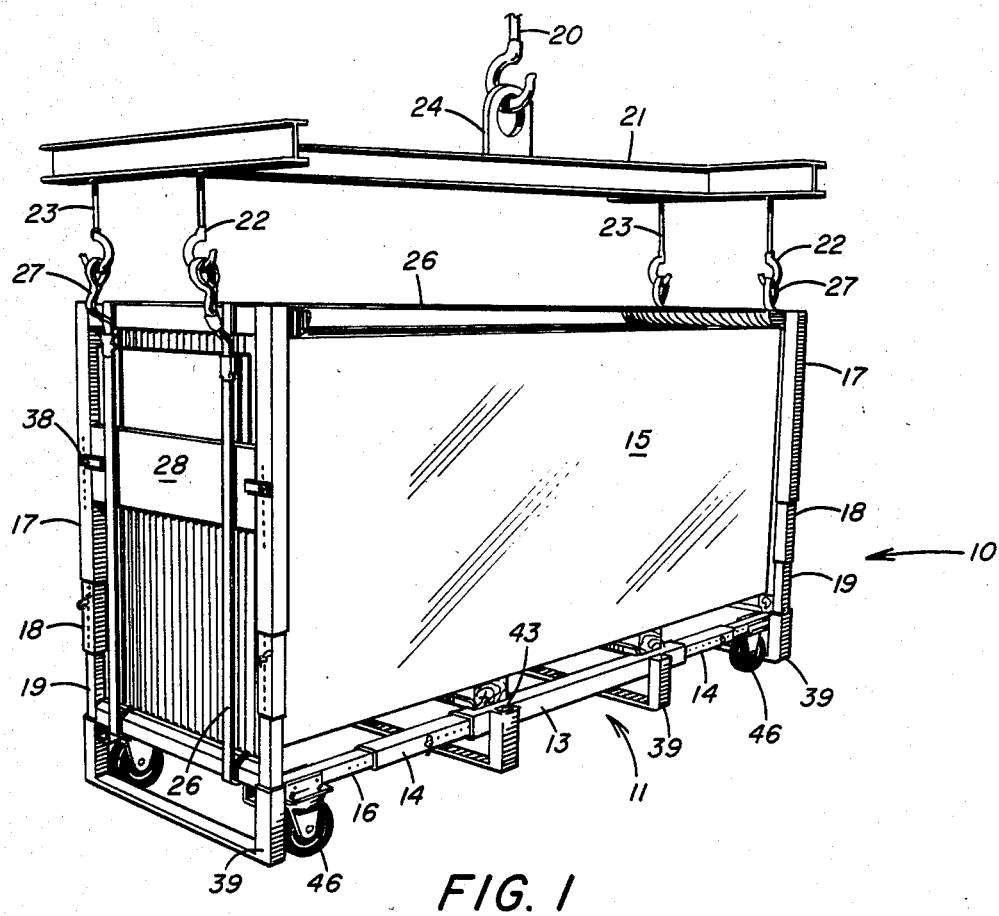
FIG. 1 is a perspective view of the shipping container shown in position for crane hoisting with a spreader bar attached to hoops in the flexible steel banding straps.

The invention of an adjustable unitized shipping container for frangible sheet-like units is shown generally at 10 in FIG. 1. The invention is depicted as being unitized and in position for hoisting by a crane or other means to the site where the installation will take place. The container 10 is provided with a rigid base unit 11 which supports large multiple glazed units 15 on edge.

Figure 2:
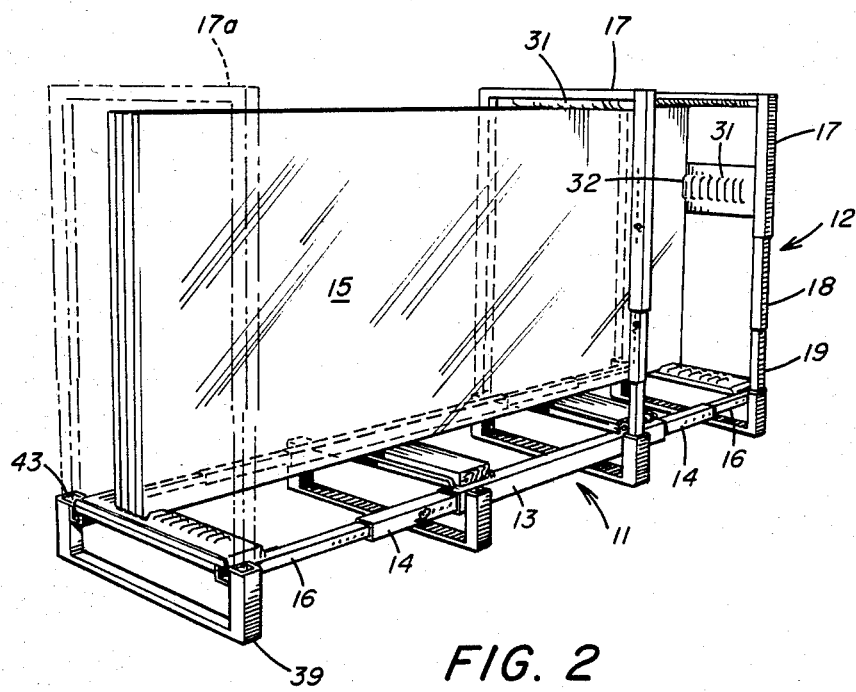
FIG. 2 is a perspective view of the container in the storage configuration in which one transverse support frame (as depicted with dashed lines) has been moved to a position closer to the other transverse support frame and several multiple glazed units have been removed.

The container 10 also provides transverse support frames 12 as shown in FIG. 2 which are slidably inserted into base 11 at transverse frame support holes 43 which are on either end of base support bars 39.

As shown in FIG. 1, flexible steel banding straps 26 are routed around the periphery of multiple glazed units 15 and form a rectangle by being routed over the top of upper transverse support frames 17 on either end of the container 10, under the base unit 11, and tensioned to compress support frames 12 and base 11 against the edges of multiple glazed units 15. The flexible banding straps 26 also provide crane hoisting loops 27 as shown in FIG. 1 as an integral part of banding straps 26. The loops 27 in the banding straps 26 coact with hooks 22 and spreader bar 21 thereby allowing crane hoisting hook 20 to hoist the entire assembly, including container 10.

Spreader bar 21 is shown of I-beam construction in a general "I" configuration, however any apparatus for transferring the lifting force provided by a crane to flexible banding loops 27 would be within the teaching of this invention. It should be noted that spreader bar 21 further includes crane hoist lift attachment tab 24 and spreader bar hooks attachment 23 which are rods attached to hooks 22 which, in turn, coact with load bearing banding loops 27.

FIG. 1 depicts the shipping container in a hoisting configuration in which caster wheels 46 are shown in position attached to base 11. The invention could, of course, be practiced without caster wheels 46, however the wheels allow for easier movement upon the building site floor.

Figure 3:
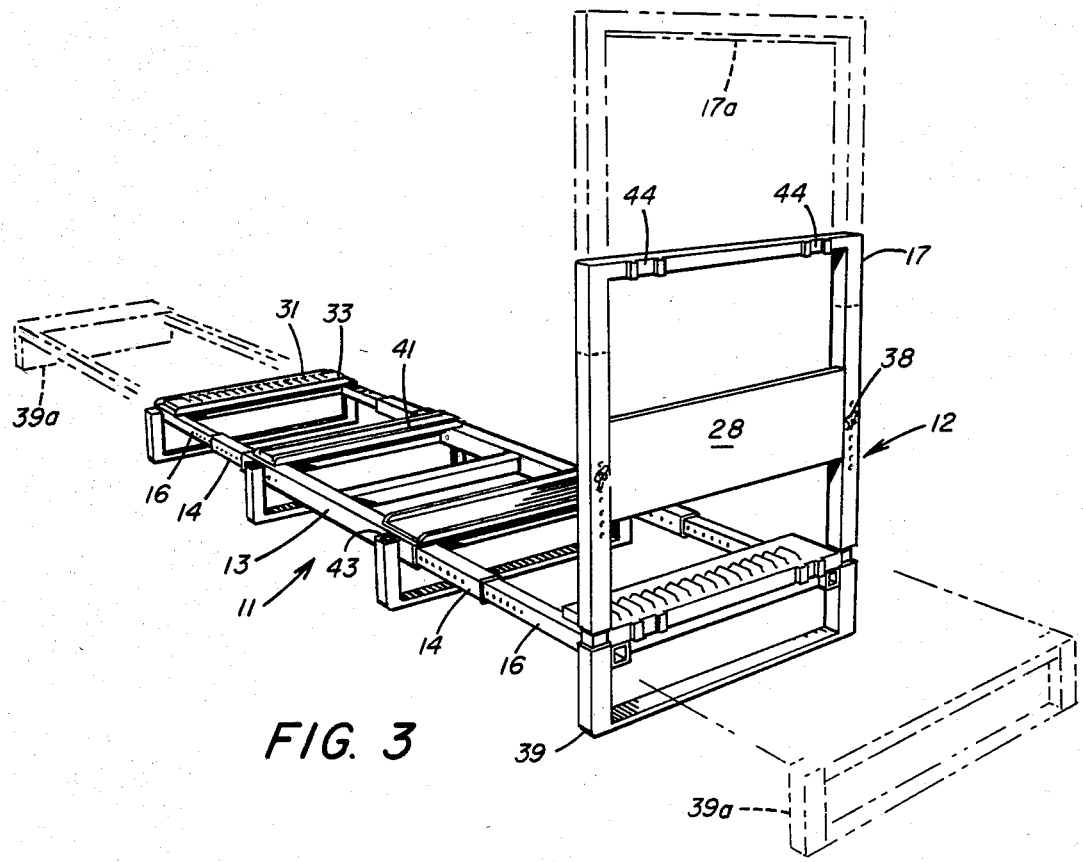
FIG. 3 is a perspective view of the shipping container showing the adjustable base and a single transverse support frame in which the dashed lines depict the range of adjustment of the telescoping base and transverse frame in accordance with the teachings of the invention.

The base 11 provides a rigid frame for supporting the multiple glazed units on edge. As shown in FIG. 3, base 11 includes center portion 13 constructed of a pair of parallel square tubing members in a general rectangular configuration with base support bars 39 extending beneath center portion 13. Center portion 13 is also provided with a pair of parallel support plates 41 on the upper surface of center portion 13 extending across another portion 13 normal to the parallel members. Support plates 41 are normally provided with a plank of wood or other suitable material for supporting the edge of the multiple glazed units. Support plates 41 and base support bars 39 and frame supports 43 are welded to base center unit 13 in a manner as known in the art.

As can be shown in FIG. 3, the center base unit 13 coacts in telescopic manner with secondary base support frame members 14 which are also constructed of square tubing. A second pair of telescoping base frame elongate members 16 coact with the secondary base support frame members 14 by sliding within the square tubing of members 14 to provide adjustment in the length of the frame of base 11 as shown by the dotted lines in FIG. 3. The end of the second telescoping base support members 16 are welded to base support bars 39 and transverse frame supports 43 as previously disclosed with respect to center unit 13.

As can be shown in FIG. 3, the outside diameter of the square tubing used for the second telescoping frame base member 16 is slightly less than the inside diameter of the square tubing of the first telescoping base frame member 14 which, in turn, has an outside diameter less than the inside diameter of the center base unit telescoping member 13. It can thus be appreciated that the units will telescopingly slide to adjust within a wide range of lengths as depicted in FIG. 3. Base unit 13 and the two telescoping units 14 and 16 when in proper position can be secured by the use of holes drilled in the square tubing in which pins or bolts are inserted and retained in position by keepers. In the preferred embodiment, the base 11 is held in lengthwise position by holes drilled through member 14, 16 and 13, and pins inserted having holes with cotter keys used as keepers to secure the pins.

Figure 4:
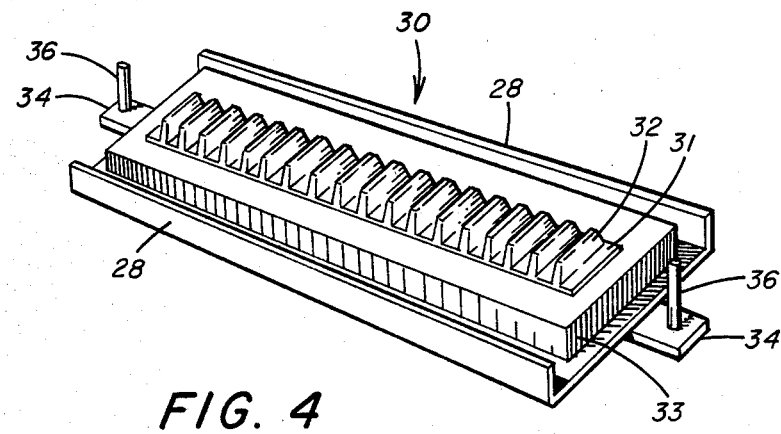
FIG. 4 is a perspective view of a sheet edge contact assembly of the type used to contact and separate the vertical edges of the multiple glazed units depicted in FIGS. 1 and 2.

The end telescoping units having the second telescoping base frame member 16 are further provided with a transverse base edge contact frame 41 and with a glass edge contact strip support 33 and edge contact strips 31. The edge contact strips 31 of the same construction as shown in detail in FIG. 4. FIG. 4 while depicting the edge contacting frame for vertical edges 28 as shown in FIG. 3, is of the similar construction to the transverse base edge contact with frame 41 which provides separation as well as edge support for multiple glazed units 15 on base 11.

Referring to FIG. 3, where it is shown that transverse support frame member 16 are further provided with a transverse base edge contact frame 41 with a glass edge contact strip support 33 and edge contact strips 31. The edge contact strips 31 of the same construction generally as shown in detail in FIG. 4. FIG. 4 depicts the edge contacting frame for vertical edges 28 as shown in FIG. 3, however the construction is similar to the transverse base edge contact frame 41 which provides separation as well as edge support for multiple glazed units 15 on base 11.

Referring to FIG. 3, where it is shown that transverse support frame 12 is provided with upper transverse frame member 17 which has an edge contact frame 28 attached between the leg members of the inverted U-shaped member 17. The edge contact frame 28 is attached to member 17 by means of holes and pins or in any other manner as known in the art. It should be noted that frame member 17 may be raised to a higher position as shown by the dashed lines in FIG. 3 to position 17A. Banding guides 44 are also provided on transverse frame member 17 as welded lugs which coact with flexible banding 26 to secure banding 26 in place.

Referring now to FIG. 2, where it is shown that transverse frame unit 12 further includes a first telescoping member 18 and a second telescoping member 19 which are both comprised of square tubing having a telescoping relationship such that the second telescoping member 19 outside diameter is less than the inside diameter of the first telescoping unit 18, which in turn, has an outside diameter less than the inside diameter of square tubing comprising the vertical legs of inverted U-shaped upper transverse frame member 17. Thus, transverse frame member 12 is adjustable in height to accommodate the height of multiple glazed unit 15. The height of the unit is maintained by the use of holes drilled through the telescoping interacting members with pins or bolts inserted in the holes so drilled and where necessary cotter keys or other keepers are used as disclosed previously with reference to telescoping base member 11.

Referring now to FIG. 4 where it is shown that the edge contact plate 30 is provided with an edge contact frame 28, a glass edge strip support 33 and an edge contact strip 31. When the edge contact plate 30 is placed in position across the primary transverse vertical frame member 17 the vertical edges of multiple glazed units 15 are placed in contact with separator tabs 32. Edge contact frame 28 is generally a rectangular piece of metal having the edges turned to accommodate rectangular glass edge support strips 33 which may be a piece of wood or other suitable material. Glass edge support strip supports rectangular edge contact strip 31, a plastic strip material having separator tabs 32 as depicted in FIG. 4. Contact strip unit 31 in the preferred embodiment is made of any suitable material such as acrylic or polyethylene plastic, however it is understood that other materials could be used without departing from the teaching of this invention. The same edge contact strip 31 is utilized on the vertical edge contact plate 30 and also used on base member 16 as shown in FIG. 3 and under the top edge of transverse frame 17 as shown in FIG. 2 to contact all four edges of multiple glazed units 15.

The construction of base 11 is preferably constructed of telescoping fitted square tubing members as previously disclosed, however it is only necessary that the base 11 be structurally capable of supporting the multiple glazed units 15 and at the same time that the base be adjustable in length to accommodate different lengths of various sized multiple glazed units 15. In a like manner, the construction of transverse support frames 12, as shown in the preferred embodiment, is not limiting to the invention but need only be a frame member having adjustment in height to accommodate the vertical height of multiple glazed units and having edge contact and separator strips for stabilizing the multiple glazed units.

The loading, unitizing, transporting, unloading and storage of multiple glazed units will now be described.

In order to load the multiple glazed units 15 into the shipping container 10, it is necessary that a transverse frame member 12 be adjusted in height to accommodate the correct vertical height of the multiple glazed unit 15 when lying on edge. Once that adjustment is made to the telescoping members 17, 18 and 19 of the transverse frame 12, transverse frame member 12 is inserted into transverse frame support hole 43 in base support bars 39 as depicted in FIG. 2. Additionally, edge contact frame 28 which includes edge contact strip 31 and separator tabs 32 as depicted in FIG. 4 is placed in position to contact the vertical edge of the multiple glazed unit 15 as depicted in FIG. 2. Once transverse frame member 12 is in position, the base 11 is adjusted in length in a like manner using telescopic members 13, 14 and 16 to adjust the base so that when the second transverse frame member 12 is placed in position on and opposite the first transverse frame member 12 that by running a flexible steel band 26 over the tops of transverse frame member 17 and under the base 11, the entire container can be unitized. Prior to loading of the multiple glazed units, additional glass edge contact strips 31 with separator tabs 32 are placed on the underneath surface of the upper transverse frame member 17 as well as on either end of base 11. Additional glass support material is placed in base edge contact frame 41 which is attached across parallel members in center frame 13.

Once the base 11 is positioned appropriately and the transverse frame members 12 are positioned in height appropriately, one transverse frame member 12 is inserted in the base 11 as previously disclosed before placing the multiple glazed units on the base. With the one transverse frame member 12 attached to base 11 a number of multiple glazed units 15 can be placed in position until the entire container is loaded. When loaded, the second transverse frame member 12 is placed on the end opposite of the member previously placed on the base 11 and this second transverse frame member is slidably inserted into transverse frame support holes 43 as previously discussed with respect to the first transverse frame member.

With both transverse frame members 12 attached to base 11, flexible banding straps 26 are routed over the top of the upper transverse frame members 17, down either end of the container parallel to the edge of the multiple glazed units 15 and under the base 11 but above base support bars 39 as shown in FIG. 1. In the preferred embodiment, a pair of parallel banding straps made of flexible steel are used. The banding straps are tensioned to compress the transverse frame members against the top and ends of the glass by means of the edge contact strips. Tension is placed on the bands to unitize the container. When the bands 26 are tightened, the transverse frame members no longer will be able to be removed from the base unless the banding member is severed. Banding straps 26 are further provided with loops in the upper portion of the band as shown in FIG. 1. The loops are load bearing and can be picked up by a spreader bar or other type of hoisting apparatus.

Removal caster wheels mounted on channels coact with the underside of square tubing of the frame 11 to provide mobility to the container. The caster wheels 46 extend slightly below the bottom plane established by base support bars 39 so that the weight of the entire shipping container rests upon the caster wheels.

Once the container is unitized by tensioning flexible banding straps 26 it is transported by means of truck of other means to the building site. It should be understood that the open areas under frame 11 allow for lifting by a fort lift, hand dolly or other lifting devices.

Once the container is hoisted to the site by means of load bearing banding loops 27, it is rolled to position for use or storage by means of removable caster wheels 46 or by the use of a fork lift or other transporting means as known in the art. When the glass 15 is to be installed, the banding straps 26 are severed. If the transverse support frames 12 are not lifted, the weight of the frames exerts a downward force upon edge contact strips 31 to keep the multiple glazed units 15 in position. Separator tabs 32 serve to separate the multiple glazed units to avoid the units 15 from chafing or rubbing during transporting, and also make the units 15 easily removable at the job site. One inverted U-shaped transverse support frame 12 is slidably removed upward from either end of base 11 and then reinserted by means of transverse means support holes 43 in base 12 at a position closer to the opposite end from which it was removed as shown in FIG. 2.

When the unit is in the configuration as shown in FIG. 2, multiple glazed units 15 can easily be removed individually by applying vacuum hand cups or other removal methods known in the art. The multiple glazed units 15 are readily accessible for unpacking by having the two transverse support frames 12 located near one end of base 11.

It is also contemplated that once the multiple glazed units 15 have been removed that the base units will fit one upon the top of each other and that the transverse support frames will fit next to each other. The entire unit will thus "nest" for easy return of the shipping containers. By "nesting3[ the parts of the containers, many shipping containers can be stored in a very small space.

As can be appreciated, the invention is not limited to the above example which is presented for illustration purposes only, but only by the claims herein.

We claim:

1. An adjustable shipping container for frangible sheets, comprising:
   a base, said base having adjustable rigid frame means for altering the length of said base;
   a first rigid sheet supporting means removably attached to said base, said first supporting means adjustable for altering the height of said first supporting means relative to said base;
   a second rigid sheet supporting means removably attached to said base in spaced relation to said first supporting means, said second supporting means adjustable for altering the height of said second supporting means relative to said base, said first and second supporting means attached to said base to provide spaced enclosures for receiving the sheets and for maintaining the sheets in a substantially vertical position on the base;
   sheet edge contacting means attached to each of said first and second supporting means, for maintaining said sheets in spaced relationship to one another;
   banding means engaging the base and having its course over said first and second supporting means to urge said first and second supporting means toward the sheets and said base to secure the sheets on the container;
   load-bearing loops attached to said banding means;
   receiving means attached to said base between said first and second supporting means for receiving and third sheet supporting means to maintain the sheets on edge during loading or unloading the sheets on or from the container; and
   load-bearing caster wheels removably attached to said base.

2. The container as set forth in claim 1 wherein said third sheet supporting means is either said first or second sheet supporting means.

3. The container as set forth in claim 1, further comprising at least one additional supporting means and a corresponding number of additional receiving means.

4. The container as set forth in claim 1, wherein each of said receiving means comprises a generally U-shaped member attached to the underside of said base with the ends of the said U-shaped member extending upward to receive respective ends of said sheet supporting means.

5. The container as set forth in claim 4, wherein each said sheet supporting means is an inverted, generally U-shaped member.

* * * * *

UNITED STATES PATENT AND TRADEMARK OFFICE
CERTIFICATE OF CORRECTION

PATENT NO. : 4,512,473

DATED : April 23, 1985

INVENTOR(S) : Ronald J. Thomaswick and James R. Rowley

It is certified that error appears in the above-identified patent and that said Letters Patent is hereby corrected as shown below:

Column 8, line 33, "and" should be --a--.

Signed and Sealed this

Tenth Day of September 1985

[SEAL]

Attest:

DONALD J. QUIGG

Attesting Officer     Acting Commissioner of Patents and Trademarks - Designate